United States Patent [19]

Kimura

[11] Patent Number: 4,788,385

[45] Date of Patent: Nov. 29, 1988

[54] METHOD OF DETECTING A COORDINATE

[75] Inventor: Kiyoshi Kimura, Miyagi, Japan

[73] Assignee: Alps Electric Co., Ltd., Japan

[21] Appl. No.: 937,318

[22] Filed: Dec. 3, 1986

[30] Foreign Application Priority Data

Dec. 25, 1985 [JP] Japan ................................. 60-290797

[51] Int. Cl.[4] ............................................. G08C 21/00
[52] U.S. Cl. .................................................... 178/19
[58] Field of Search .................... 178/18, 19; 324/207, 324/208

[56] References Cited

U.S. PATENT DOCUMENTS 3,732,369  5/1973  Cotter .................................. 178/18
4,582,955  4/1986  Blesser ................................. 178/19

Primary Examiner—Stafford D. Schreyer
Attorney, Agent, or Firm—Guy W. Shoup; Paul J. Winters

[57] ABSTRACT

A coordinate detection method for detecting a coordinate position by transmitting scanning signals in order to each of main loops composed of a plurality of conductors embedded in an input plane in parallel relation to each other, then by detecting as the interpolating region, a general region at which a coordinate pointer is pointed in the input plane, and thereafter by interpolating the position in the general region. In order to select a general region, absolute values of the detection voltage are compared between a loop at which the inversion of the polarity of the initial magnetic field is detected by the coordinate pointer and a loop a predetermined number behind the above loop in the scanning direction, to determine a general region to the interpolated.

5 Claims, 5 Drawing Sheets

METHOD OF DETECTING A COORDINATE

BACKGROUND OF THE INVENTION

1. Field of the Invention

The present invention relates to a method of detecting a coordinate accurately by reading a position pointed on an input plane, and more particularly to a coordinate detecting method characterized by determining a general region at the time of detecting the coordinate.

2. Description of the Prior Art

A coordinate detecting technology for highly accurately reading a position pointed on a plane is exemplified by the applicant's Japanese Patent Application No. 60-117761. The coordinate detecting apparatus disclosed in the Japanese Patent Application sends scanning signals of the same phase simultaneously to at least two of a plurality of conductors embedded in a tablet in parallel relation, detects by a coordinate pointer signals produced by the scanning signals sent to the conductors, discriminates whether the polarity of the detected signal is inverted, then detects signal levels before and after the polarity is inverted, and calculates, based on the position in which the inversion of the polarity is discriminated and the signal level, the position pointed by the coordinate pointer.

FIG. 8 illustrates the principal construction of this prior art. Reference numeral 1 designates a switching circuit, 2 conductors embedded in an input plane in parallel relation, 3 a pickup for detecting, as an electrical signal, a magnetic field produced when a high-frequency current flows in the individual conductor, 4 an amplifier circuit, 5 a polarity discrimination circuit for discriminating the polarity of the signal detected and amplified by the pickup 3, 6-1, 6-2 sample/hold circuits, 7 an A/D converter, 8 an oscillator for supplying a high-frequency current to the individual conductor 2, 9 a driver, 10 a detector circuit, 11 an adder, 12 a control unit.

In FIG. 8, firstly, a general detection is made as to which conductor 2 the pickup 3 is near. Secondly, a highly accurate detection is made as to where the pickup 3 is disposed between the conductor 2 and a conductor adjacent thereto.

The first general detection will now be described in more detail. Desired data from the control unit 12 are transmitted to the switching circuit 1. Based on the data, the switching circuit 1 selects two alternate conductors 2, i.e. A and C, B and D, C and E, D and F, and so forth, to be scanned by the same high-frequency current generated by the oscillator 8 and the driver 9. The magnetic field developed by each two conductors 2 is detected in the form of an electrical signal by the pickup 3 and is amplified by the amplifier circuit 4. Then, the amplified signal is supplied to the polarity discrimination circuit 5 where a discrimination is made as to which pair of conductors shows a polarity inversion in the pickup signal. If the inversion of the polarity is discriminated, this message is transmitted to the control unit 12. Thus a general position of the pickup 3 between two conductors is detected.

The second, more accurate detection will now be described in more detail. Upon receipt of the message that the polarity inversion is detected, the control unit 12 supplies a hold pulse to a sample/hold circuit 6-1, at which time an input signal $V_2$ amplified by the amplified circuit 4 detected from one of the two conductors detected by the detection circuit 10 is held and hence memorized. Then, the control unit 12 issues the message to the switching circuit 1 to apply the high-frequency current to the other conductor. Then a hold pulse is supplied to the sample/hold circuit 6-2, at which time an input signal $V_1$, amplified by the amplifier circuit 4 and detected by the detection circuit 10 is held and hence memorized. The thus memorized signals $V_1$ and $V_2$ are supplied to the adder 11 to calculate a sum signal $(V_1+V_2)$. The sum signal $(V_1+V_2)$ is supplied to a reference voltage input terminal $V_{REF}$ of the A/D converter 7, and one of the signals $V_1$, $V_2$, for example, $V_2$ is supplied to an input terminal $V_{IN}$. The value of the following equation is calculated.

$$X_i = \frac{V_1}{V_1 + V_2} \tag{1}$$

By inputting the value of the denominator and the value of the numerator of the equation (1) to the reference voltage input terminal $V_{REF}$ of the A/D converter 7 and the input terminal $V_{IN}$, respectively, it is possible to calculate the value of the equation (1). According to the equation (1), the value of $X_i$ is obtained, and the value of $Y_i$ is likewise obtained; then these values are transmitted to the control unit 12. Based on the input coordinate values $(X_i, Y_i)$, the positional coordinates $(X, Y)$ on the input plane are determined.

However, this prior art calculating method has the following problems. Although a calculation is made assuming that the polarity is inverted at a midpoint between the selected two conductors 2, this position of inversion would be shifted from the midpoint between the selected two conductors 2 due to the magnetic field generated from the common conductor through which the electric current is supplied to each of the two conductors 2, thus causing a significant calculation error. In an effort to avoid the influence of the common conductor, it has been proposed to encircle the selected two conductors by compensation loops. But, since the provision of this compensation loop does not completely avoid the calculation error, an interpolation is required in view of the shifting of the position of polarity inversion. Particularly in the case where scanning of the compensation loops is made one after another in order, this shifting causes an inaccurate scanning. More specific explanation is as follows.

FIG. 6 illustrates a detection voltage distribution in the absence of the positional shifting of the polarity inversion. In the region between 10 mm and 30 mm, a distribution of signals from the loops are shown designated as $L_{10}$, $L_{15}$, $L_{20}$, $L_{25}$, $L_{30}$. Here, the distribution of the magnetic strength Hz corresponding to each loop $L_{10}$, $L_{15}$, $L_{20}$, $L_{25}$, $L_{30}$ is positive at the leftside of the zero point and is negative at the rightside of the zero point. Regarding the voltage, the absolute value of the magnetic strength Hz is detected. Regions 10 mm$\leq$X$\leq$20 mm, 15 mm$\leq$X$\leq$25 mm, and 20 mm$\leq$X$\leq$30 mm are referred to as a segment 2 ($S_2$), a segment 3 ($S_3$), and a segment 4 ($S_4$), respectively.

When the pickup is at the position T (X=21 mm) in FIG. 6, Hz<0 (position T is at the rightside of zero point of the curve $L_{20}$) until $S_4$, X=20 mm, and Hz>0 at $S_5$, X=25 mm, whereupon the detection voltage $V_2$ is obtained by the loop $L_{25}$. Then the segment two behind segment $S_5$ namely $S_3$ and the loop $L_{15}$ are selected, and the detection voltage $V_1$ thereby is obtained. In this example, $S_3$ corresponding to the region of 15 mm$\leq$X$\leq$25 mm is selected as an interpolating segment.

FIG. 7 illustrates an example in which the position of the polarity inversion is shifted. In this example, the distribution curve of the above-mentioned magnetic strength Hz is shifted in the positive direction of X, and like reference numerals designate those similar to the above-mentioned loops and segments. Also in the example, the pickup is disposed in the position T which corresponds to X=21 mm.

In this case, $S_4$ X=20 mm and hence $H_z>0$. Therefore, the interpolating region two segment behind is S2, that is, the interpolation is made in the region of 10 mm$\leq$X$\leq$20 mm.

Thus, because it is out of the region of the original segment, an error would occur in calculating interpolation at that region. In this example, although it is ideal to interpolate at $S_3$, it must interpolate at $S_4$ in order to improve the accuracy even if the erroneous discrimination of the segment is made.

SUMMARY OF THE INVENTION

With the foregoing prior art problems in view, it is an object of the present invention to provide a coordinate detection method characterized by specifying a necessary and general region for accurate interpolation.

According to the present invention, there is provided a coordinate detection method for detecting a coordinate position by sending out scanning signals in order to each of the main loops composed of a plurality of conductors embedded in an output plane in parallel relation to each other, then by detecting, as the interpolating region, a general region at which a coordinate pointer is pointed on the input plane, and thereafter by interpolating the position in the general region, characterized in that during the detection of the general region, absolute values of the detection voltage are compared between a loop at which the inversion of the polarity of the initial magnetic field is detected by the coordinate pointer and a loop a predetermined number behind the above loop in the scanning direction, to determine a general region to be interpolated.

The above-mentioned means determines, as the interpolating region is selected, a general region based on a comparison between the absolute values of detection voltages of loops before and after the polarity is inverted. The principle of the invention will be described as follows:

FIG. 1 illustrates the detection voltage distribution by the pickup, showing the distribution in straight lines for clarity. In the description hereinbelow, likewise as above, a segment is designated by $S_n$ (n is an integral number), and a loop corresponding to Sn is designated by Ln. Each segment overlaps by 5 mm in the interpolating region of 10 mm, and the loops are formed at the intervals of 5 mm.

In the detection voltage distribution of FIG. 1, the detection voltages $V_{n-2}$, $V_n$ are used in interpolation using the segment $Sn-2$. However, because $V_{n-2}$ in the region of X<A and $V_n$ in the region of X>B are small values, and also because it is preferrable to use the value larger than at the cross point $C_1$ of $V_{n-1}$ and $V_{n-2}$ and the cross point $C_2$ of $V_n$ and $V_{n-1}$, it is desirable to interpolate normally in the range of A$\leq$X$\leq$B. That is, in FIG. 1, if the pickup is disposed at the right-side of X=5 (n−1) mm, the polarity inversion is detected only when the loop $L_n$ is driven. At that time, if the pickup is disposed in the range of 5 (n−1) mm$\leq$X$\leq$B, it is necessary to select $S_{n-2}$ as the interpolation segment, and if the pickup is in the range of B<X<$5_n$ mm, it is necessary to select $S_{n-1}$ as the interpolation segment. Accordingly, it is possible to obtain a detection voltage of a value normally larger than the above $C_1$, $C_2$ and hence it is possible to define the interpolating region which is the most suitable best region.

Therefore, with respect to the region of A<X<B, the algorithm for obtaining the most suitable segment is as follows.

Assuming that the polarity inversion of the magnetic strength Hz is detected for the first time when the loop is driven as the loops $L_0$, $L_1$ . . . are driven successively, under the following condition,
(1) $S_{n-2}$ when $V_n/V_{n-1} \geq 1$. ($V_{n-2}$, $V_n$ are used for interpolation)
(2) $S_{n-1}$ when $V_n/V_{n-1} < 1$. ($V_{n-1}$, $V_{n+1}$ Are used for interpolation),
the detection voltage to be used in interpolation is positively within the interpolation region, and is higher than the voltage at the cross points $C_1$, $C_2$, thus securing the accuracy of interpolation.

Many other advantages, features and additional object of the present invention will become manifest to those versed in the art upon making reference to the detailed description and the accompanying sheets of drawings in which a preferred embodiment incorporating the principle of the present invention is shown by way of illustrative example.

DETAILED DESCRIPTION OF THE PREFERRED EMBODIMENT

An embodiment of the present invention will now be described in connection with FIGS. 2 through 5.

Figure 3:
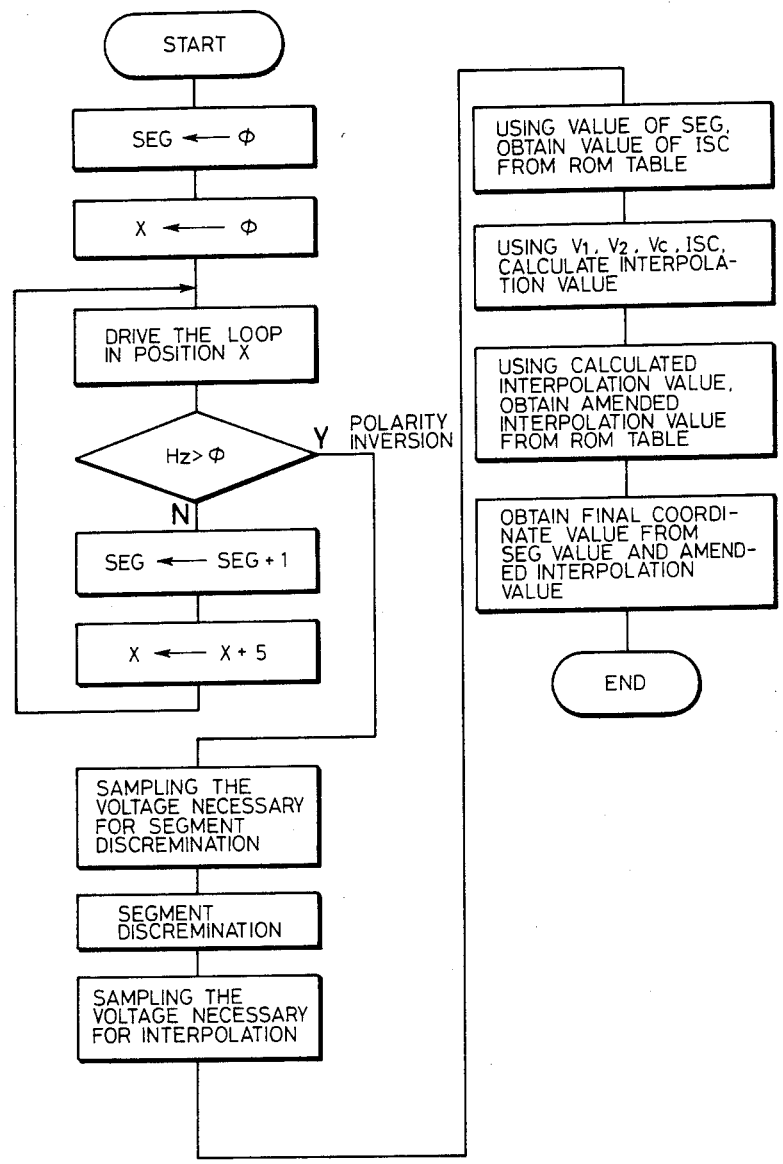
FIG. 3 is a flow chart illustrating the manner in which the coordinate detection takes place.

As shown in FIG. 3, a coordinate input apparatus carrying out the present invention comprises an input plane 2b with main and compensation loops 2a, 3a, a driver 2 for transmitting a current of a constant amplitude to the main loops 2a via an oscillator 1, a driver 3 for transmitting a current to the compensation loops 3a, a pickup 6, as a coordinate detector, having a magnetic field detection coil, an amplifier circuit 7 for amplifying the output detected by the pickup 6, a polarity discrimination circuit 8, a detector circuit 9, sample/hold amplifiers 11, 12, a multiplexer 13, an A/D converter 14, an ROM table 15 as a first memory means in which a compensation value is stored, an ROM table 16, as a second memory means, for storing an amended value of interpolation value error, and a control circuit 10. X-direction and Y-direction switching circuits 4, 5 are connected to X-direction loops and Y-direction loops, respectively, of the main loops 2a.

The main loops 2a are embedded in the input plane 2b at an interval of 5 mm in parallel relation to each other, each loop L being connected at one end of the switching circuit 4 (or the switching circuit 5 in the case of Y-direction loop) and at the other end to a source wire 2s which is in turn connected to the driver 2, thus providing the entire input plane of 200 mm×200 mm, for example. The Y-direction loops are likewise formed so as to lie perpendicularly to the X-direction loops.

The compensation loop 3a is disposed adjacent to the source wire 2s of the main loops 2a and includes an embedded conductor separate from the main loops 2a. The compensation loop 3a is connected at one end to the driver 3, which transmits to the compensation loop 3a the current of a predetermined amplitude in the direction opposite to the current flowing in the source wire 2s of the main loops 2a, and at the other end to ground or earth. In the ROM table 15 serving as the first memory means, compensation values are stored in correspondence with each loop L and the Y-direction region, as exemplified in Table 1.

TABLE 1

| | Compensation Values ISC | | | | | | |
|---|---|---|---|---|---|---|---|
| | Y (mm) | | | | | | |
| X (mm) | 20 (180) | 25 (175) | 30 (170) | 40 (160) | 60 (140) | 80 (120) | 100 |
| 5 | 0.486 | 0.471 | 0.455 | 0.425 | 0.382 | 0.359 | 0.352 |
| 10 | 0.378 | 0.364 | 0.350 | 0.323 | 0.286 | 0.267 | 0.262 |
| 15 | 0.354 | 0.341 | 0.328 | 0.304 | 0.269 | 0.252 | 0.246 |
| 20 | 0.357 | 0.345 | 0.332 | 0.309 | 0.276 | 0.259 | 0.254 |
| 25 | 0.368 | 0.357 | 0.345 | 0.323 | 0.292 | 0.275 | 0.269 |
| 30 | 0.382 | 0.372 | 0.361 | 0.340 | 0.310 | 0.293 | 0.288 |

In the ROM table 15, the compensation value ISC corresponding to the result of detection by the control circuit 10 is called therefrom, and then an interpolation value is calculated by a calculating means furnished in the control circuit 10.

On the other hand, in the ROM table 16 serving as the second memory means, an accurate coordinate position is obtained from the calculated interpolation value by amending an error thereof. For example, amending values are provided at an interval of 0.1 mm of the interpolation values with respect to the detected segment. This example is shown in Table 2, in which the amending values range from 0.00 mm to 2.00 mm under the condition that Y=100 mm at the segment SEG=19 of X=95 mm and X=105 mm, the height of detection of Z=15 mm.

Thus according to Table 2, in the case the calculated result of the interpolation value is 0.90 mm, 0.67 mm is to be selected.

TABLE 2

| Amending Values | |
|---|---|
| Interpolation Value (mm) | Amending Value (mm) |
| 0.00 | 0.00 |
| 0.10 | 0.07 |
| 0.20 | 0.14 |
| 0.30 | 0.21 |
| 0.40 | 0.29 |
| 0.50 | 0.36 |
| 0.60 | 0.44 |
| 0.70 | 0.52 |
| 0.80 | 0.59 |
| 0.90 | 0.67 |
| 1.00 | 0.75 |
| 1.10 | 0.84 |
| 1.20 | 0.92 |

TABLE 2-continued

| Amending Values | |
|---|---|
| Interpolation Value (mm) | Amending Value (mm) |
| 1.30 | 1.00 |
| 1.40 | 1.09 |
| 1.50 | 1.17 |
| 1.60 | 1.26 |
| 1.70 | 1.35 |
| 1.80 | 1.44 |
| 1.90 | 1.53 |
| 2.00 | 1.63 |

The pickup 6 has at its distal end the magnetic detection coil for transmitting a voltage generated by the magnetic detection coil both to the detector circuit 9 and the polarity discrimination circuit 8 via the amplifier circuit 7. At that time, the height of pickup is preferably about 1.5 times the pitch of the loops for interpolation in relation with the error and the detected output.

The detection of position of the pickup 6 takes place at the following three steps:

(1) detecting a segment as a general or rough position of the pickup 6 as shown in the flow chart of FIG. 3; interpolating, namely, detecting a detailed position in the detected segment; and combining the position of the segment with the detailed position in the segment.

For detecting the segment, the drivers 2, 3 are actuated by using a sine wave generated by the oscillator 1. In this condition, the current by the driver 2 flows in order through each loop from L the switching circuits 4, 5 designated by the control circuit 10, at which time a current of an amplitude 0.5 times that of the current flowing in the main loops 2a is caused to flow in the compensation loop 3a by the driver 3.

When the current flows in each loop L, a magnetic field generated with respect to this loop L is detected by the pickup 6 and is then amplified to a signal of a desired amplitude by the amplifier circuit 7. This signal is compared in phase with the output of the oscillator 1 by the polarity discrimination (phase comparison) circuit 8. In other words, the polarity of the magnetic field can be detected in the polarity discrimination circuit 8.

Figure 6:
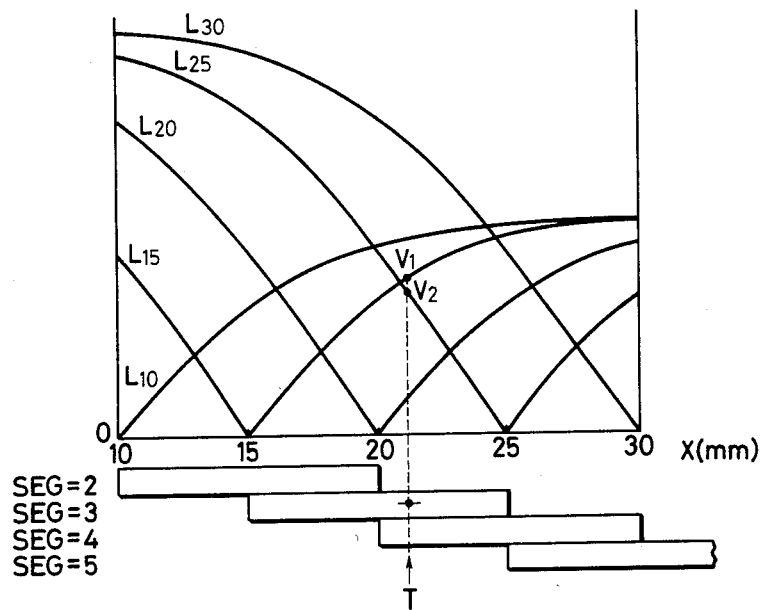
FIGS. 6 and 7 are diagrams illustrating a conventional method of segment detection.
Figure 7:
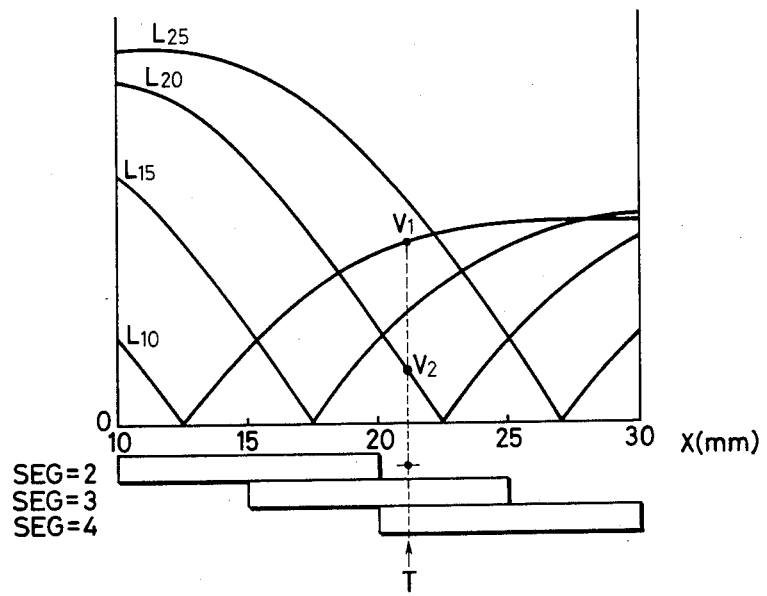

Assuming that the output of the polarity discrimination circuit 8 is at high level as the loop L on the leftside of the pickup 6 in FIG. 6 is driven, the polarity of the detected magnetic field is inverted when the loop L on the rightside of the pickup 6 is driven, and hence, the output of the polarity discrimination circuit also is inverted to low level.

Therefore, when the current is transmitted through the loop L selected successively from $X_0, X_1, X_2, \ldots X_n$ by the control circuit 10, the loop $L_n$, at which the output of the polarity discrimination circuit 8 is inverted, is detected near the pickup 6. Upon ascertaining the loop $L_n$, the voltage $V_n$ at the loop $L_n$ and the voltage $V_{n-1}$ at the loop n−1 one behind the loop $L_n$ are detected, and then the two voltages $V_n$, $V_{n-1}$ are compared to each other, thus determining the region (segment) to be interpolated in accordance with the above-mentioned algorithm.

Figure 1:
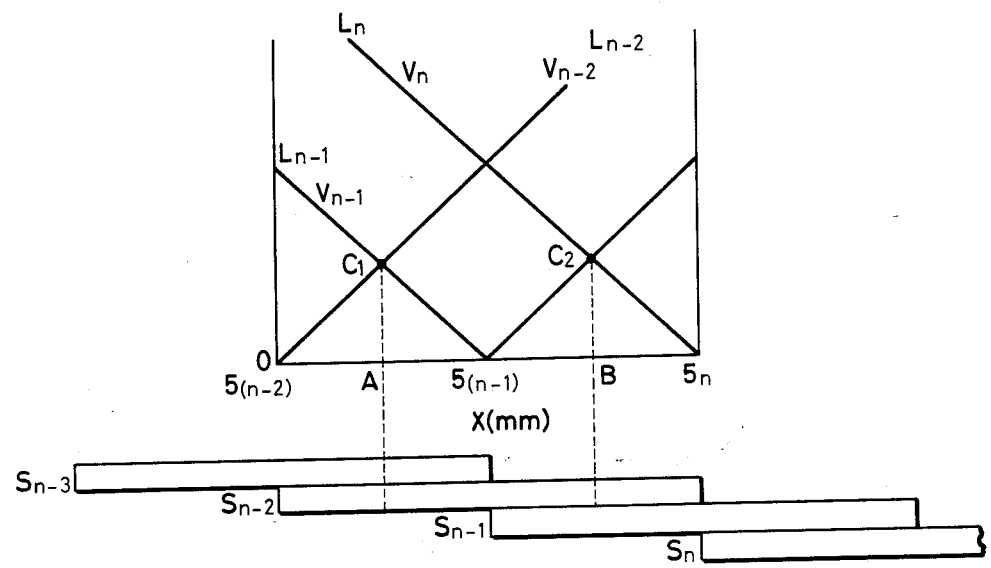
FIG. 1 is a diagram illustrating the principle of determining a segment according to the present invention.
Figure 8:
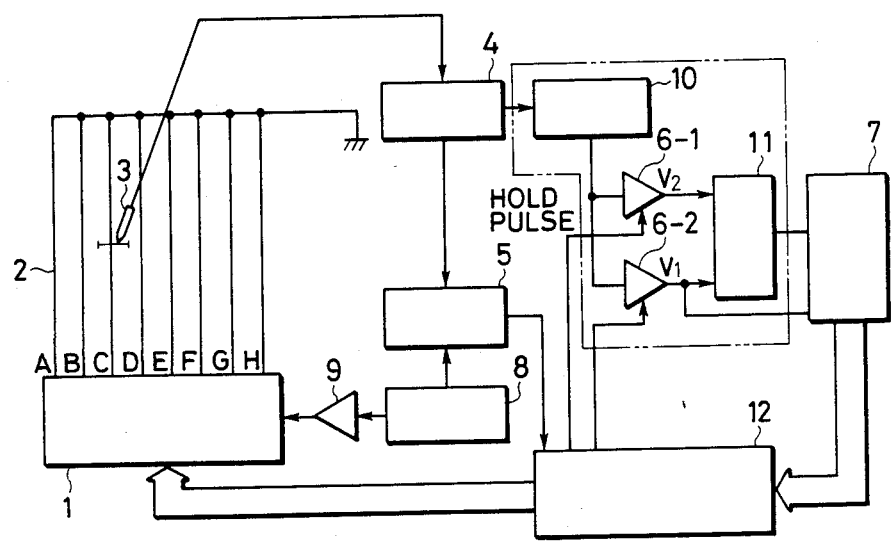
FIG. 8 is a schematic view illustrating the principle of a conventional coordinate input apparatus.
Figure 2:
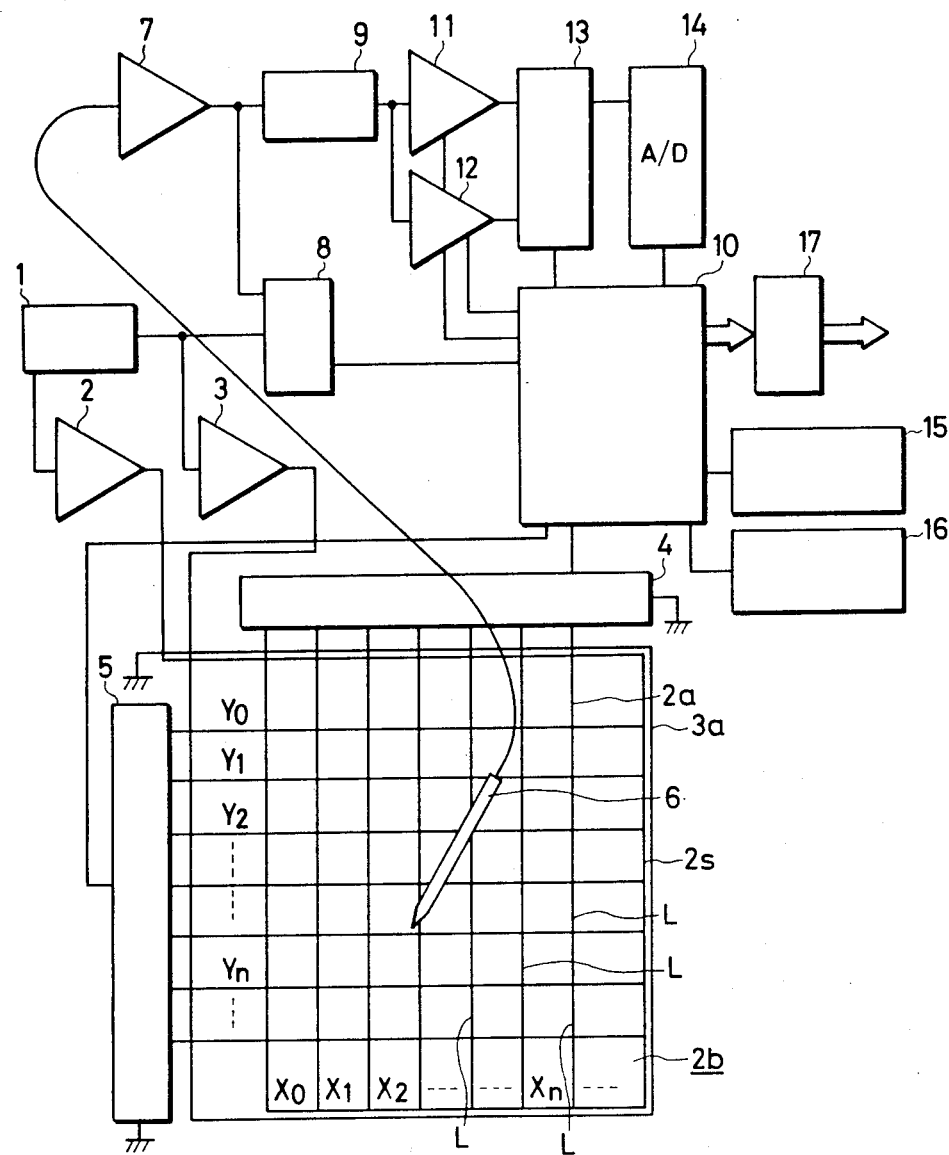
FIG. 2 is a schematic view illustrating the principle of a coordinate input apparatus carrying out the present invention.

After the segment (for example $S_{n-2}$ in FIG. 1) has been determined, the control circuit 10 firstly selects the loop $L_{n-2}$ which is disposed on the leftside of the segment $S_{n-2}$, at which time the signal having passed the amplifier circuit 7 is converted into a direct current through the detection circuit 9 and is then held as a direct voltage by the sample/hold circuit 12.

Figure 4:
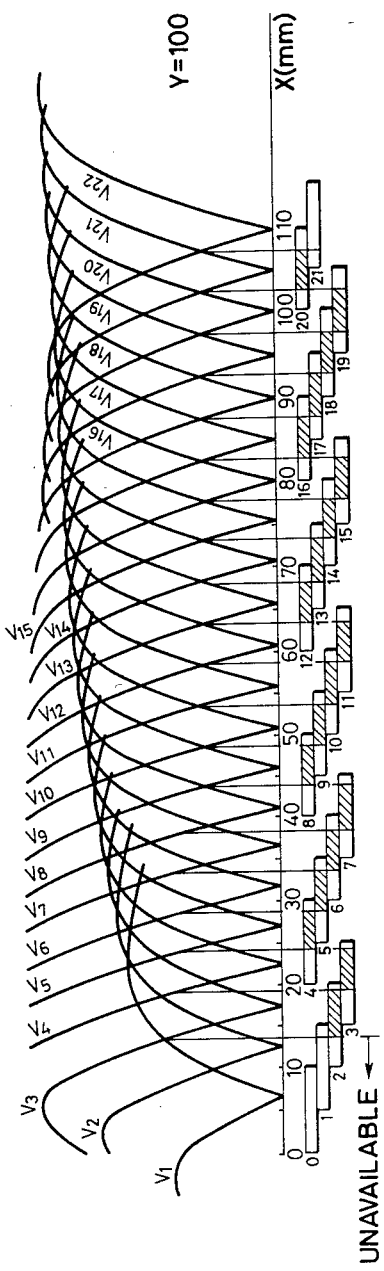
FIGS. 4 and 5 are diagrams showing an example of determination of detection voltage and segment.
Figure 5:
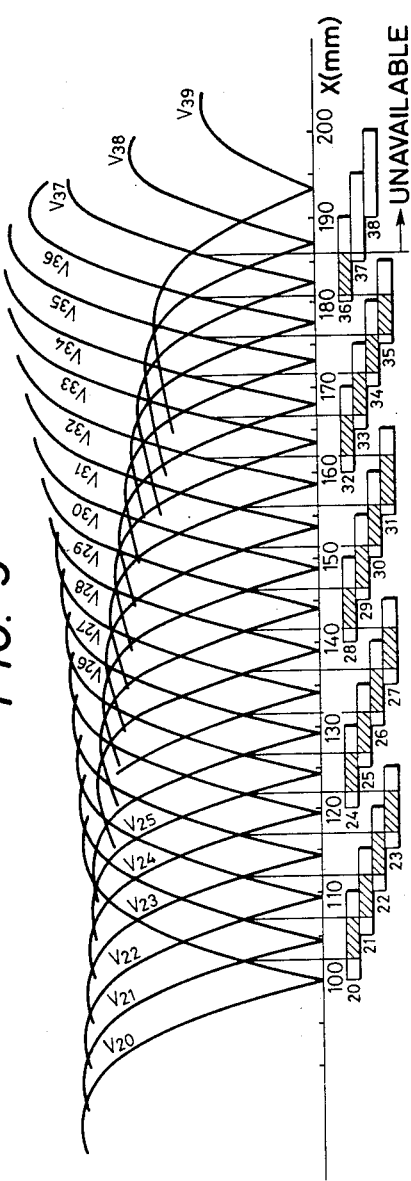

More specifically, FIGS. 4 and 5 show the distribution of the detection voltage near Y=100 mm, and the interpolation region with respect to this distribution curve. A rectangular portion illustrated below the X axis is the above-mentioned segment S; when the pickup 6 is disposed at the sectioned area in the rectangular portion, the corresponding segment is selected to make an interpolation. In FIGS. 4 and 6, the positions of A and B of FIG. 1 have been shifted and are disposed near the border of the segment. In such case, a desirable segment can be selected under the following condition:

(1) $S_{n-1}$ where $V_n/V_{n-1} < 2$
(2) $S_{n-2}$ where $V_n/V_{n-1} \geq 2$

Therefore, the segment can be determined by the following argorithm.

Assuming that when the loop $L_n$ is driven as the loop $L_1, L_2 \ldots$ are driven in order, the polarity inversion of the magnetic field strength Hz is detected, (1) unavailable where n=1, 2,
(2) $S_2$ where n=3 and $V_3/V_2 < 4$ unavailable where n is other than the above.
(3) $S_{n-2}$ where $4 \leq n \leq 8$ and $V_n/V_{n-1} \geq 2$, $S_{n-1}$ where n is other than the above.
(4) $S_{n-2}$ where $9 \leq n \leq 32$ and $V_n/V_{n-1} \geq 1$, $S_{n-1}$ where n is other than the above.
(5) $S_{n-1}$ where $35 \leq n \leq 37$ and $V_{n-1}/V_n \geq 2$, $S_{n-1}$ where n is other than the above.
(6) $S_{36}$ where n=38 and $V_{37}/V_{38} \leq 4$.
(7) unavailable where n=39.

It is noted that the results where the region is near the peripheral portion of the input plane are unavailable because the detection error is large in that area.

As above mentioned, the segment is determined, and then the voltage held in the sample/hold circuits 11, 12 is selected by the multiplexer 13 according to the signal of the control circuit 10. Thereafter this voltage is converted into a digital value by the A/D converter 14 to thereby obtain the voltage $V_{n-2}$, $V_n$ from the loop $L_{n-2}$, $L_n$.

The switching circuits 4, 5 of the control circuit 10 are opened, thus causing the predetermined current to flow only in the compensation loop 3a. Consequently, it is possible to obtain the voltage $V_c$ only from the compensation loop 3a by A/D converting the detected output according to the method mentioned above.

Subsequently, the control circuit 10 calls the compensation value ISC for example from Table 1 in correspondence with the values (distance in the same direction) of X and Y directions of the segment obtained by the segment discrimination, and the interpolation value P' is calculated by the calculating means in the control circuit 10 from the following equation $$P' = \frac{V_{n-2} - ISC \cdot V_c}{V_{n-2} + V_n} \quad (2)$$

by substituting the detected values for the voltage $V_{n-2}$, $V_n$, $V_c$ and ISC in this equation.

Upon calculation of the interpolation value P', a corresponding amending value is called from the ROM table 16 in which the amended values P for amending the above-mentioned error are stored, thereby obtaining a coordinate value which specifies the position in the segment. Thereafter, the coordinate of position of the segment and the coordinate value in the segment are combined by the calculating means in the control circuit to thereby calculate the final X coordinate of the point position of the pickup 6.

Likewise, the Y coordinate of the point position of the pickup 6 is calculated, and then the calculated coordinate values are output to a host computer via an interface circuit 17.

According to the above-mentioned embodiment, following advantageous results can be achieved.

(1) Since the interpolation takes place normally near the center of the segment, it is possible to reduce the error to a minimum.

(2) The voltage used in interpolation is relatively high, which is advantageous to the circuit.

(3) Because the voltage ratio is employed, there is no influence by non-uniformity between the products.

(4) The polarity discrimination circuit is the only circuit required.

(5) Since the A/D conversion takes place only one more time than in interpolating according to the prior art, it does not require a long time for processing.

According to the present method, since the coordinate detection is made by determining a general region or a segment to be interpolated by comparing the detection voltages from the loop before and after the polarity inversion, accurate interpolation can be achieved, thus avoiding the error occurrence which results from the error in segment selection. Further, because of the use of the voltage ratio, it is possible to make an accurate detection without being influenced by the non-uniformity of the products.

While I have shown and described the preferred form of the present invention and have suggested modifications therein, other changes and modifications may be made therein within the scope of the appended claims without departing from the spirit and scope of the invention.

What is claimed is:

1. A coordinate detection method for detecting a position of a pointer in an input plane composed of a plurality of conductor loops arranged at spaced intervals in parallel along at least one coordinate direction, comprising the steps of:

transmitting scanning signals through each of the loops in order;

detecting magnetic field signals at the position of the pointer resulting from transmitting the scanning signals through each of the loops, and detecting at which loop an inversion of polarity in the magnetic field signals occurs;

detecting a first voltage value of the magnetic field signal for the loop at which the polarity inversion is detected, and a second voltage value of the magnetic field signal for another loop prior to the detected loop;

comparing a ratio of the first and second voltage values to a reference value; and selecting one of a series of overlapping segments, each corresponding to an interval defined by a respective spaced pair of loops along the one coordinate direction, as a general region in which the pointer is detected to occur, wherein the selection of the one segment is varied as between adjacent overlapping segments depending upon the comparison of the ratio of voltage values to the reference value.

2. A coordinate detecting method according to claim 1, in which said detection voltage values are compared so as to discriminate an unavailable region at a peripheral portion of said input plane.

3. A coordinate detection method according to claim 1, further comprising the step of calculating an interpolated value representing the coordinate position of the pointer in the one coordinate direction using the voltage values of magnetic field signals for the pair of loops corresponding to the one segment selected as the general region.

4. A coordinate detection method according to claim 3, further comprising the steps of providing a compensation loop around the conductor loops, transmitting signals through the compensation loop in order to derive compensation values correspondingly for each of the conductor loops, storing the derived compensation values, then using a corresponding compensation value to adjust the interpolated value calculated for the position of the pointer.

5. A coordinate detection method according to claim 3, further comprising the step of storing amending values corresponding to interpolated values in order to compensate for magnetic field shift error in the conductor loops, then recalling an amending value corresponding to the calculated interpolation value for the position of the pointer.

* * * * *